United States Patent [19]

Hirt et al.

[11] Patent Number: 4,584,903

[45] Date of Patent: Apr. 29, 1986

[54] DRIVE SYSTEM FOR TWIN SCREW EXTRUDER

[75] Inventors: Manfred Hirt; Heinrich Arndt, both of Augsburg, Fed. Rep. of Germany

[73] Assignee: Zahnraderfabrik Renk A.G., Augsburg, Fed. Rep. of Germany

[21] Appl. No.: 628,525

[22] Filed: Jul. 6, 1984

[30] Foreign Application Priority Data

Jul. 14, 1983 [DE] Fed. Rep. of Germany ....... 3325395

[51] Int. Cl.⁴ ............................................. F16H 37/06
[52] U.S. Cl. ..................................... 74/675; 366/301; 366/85; 74/665 GA
[58] Field of Search .......... 74/665 N, 665 L, 665 GA, 74/675; 425/204, 208; 366/301, 85

[56] References Cited

U.S. PATENT DOCUMENTS

| 1,395,735 | 11/1921 | Sawyer | 74/675 X |
| 3,824,875 | 7/1974 | Willert et al. | 74/665 GA |
| 4,132,131 | 1/1979 | DeBruyne | 74/675 |

FOREIGN PATENT DOCUMENTS

| 1950639 | 4/1971 | Fed. Rep. of Germany. | |
| 1169502 | 12/1958 | France | 74/675 |
| 286255 | 2/1965 | Netherlands | 74/675 |
| 83547 | 4/1935 | Sweden | 74/675 |
| 877107 | 9/1961 | United Kingdom | 74/675 |
| 1421704 | 1/1976 | United Kingdom | 74/665 GA |
| 2037395 | 7/1980 | United Kingdom | 74/665 N |

Primary Examiner—George H. Krizmanich
Assistant Examiner—Dirk Wright
Attorney, Agent, or Firm—Natter & Natter

[57] ABSTRACT

A twin screw extruder drive system includes a pair of parallel juxtaposed output shafts each of which is fixed to a sun gear of a planetary gear set. Each gear set includes a plurality of planet idler gears which are only rotatable about their axes and engage both the sun gear and a ring gear. Symmetrically disposed about the circumference of the ring gear are at least two drive pinions. The two gear sets have parallel axes and are axially offset from one another with the output shafts extending through a space between the planet gears of the other gear set. In one embodiment each drive pinion is driven by a separate electric motor and all motors are electronically and mechanically speed synchronized. A single electric motor is employed to drive all drive pinions in an alternate configuration.

20 Claims, 3 Drawing Figures

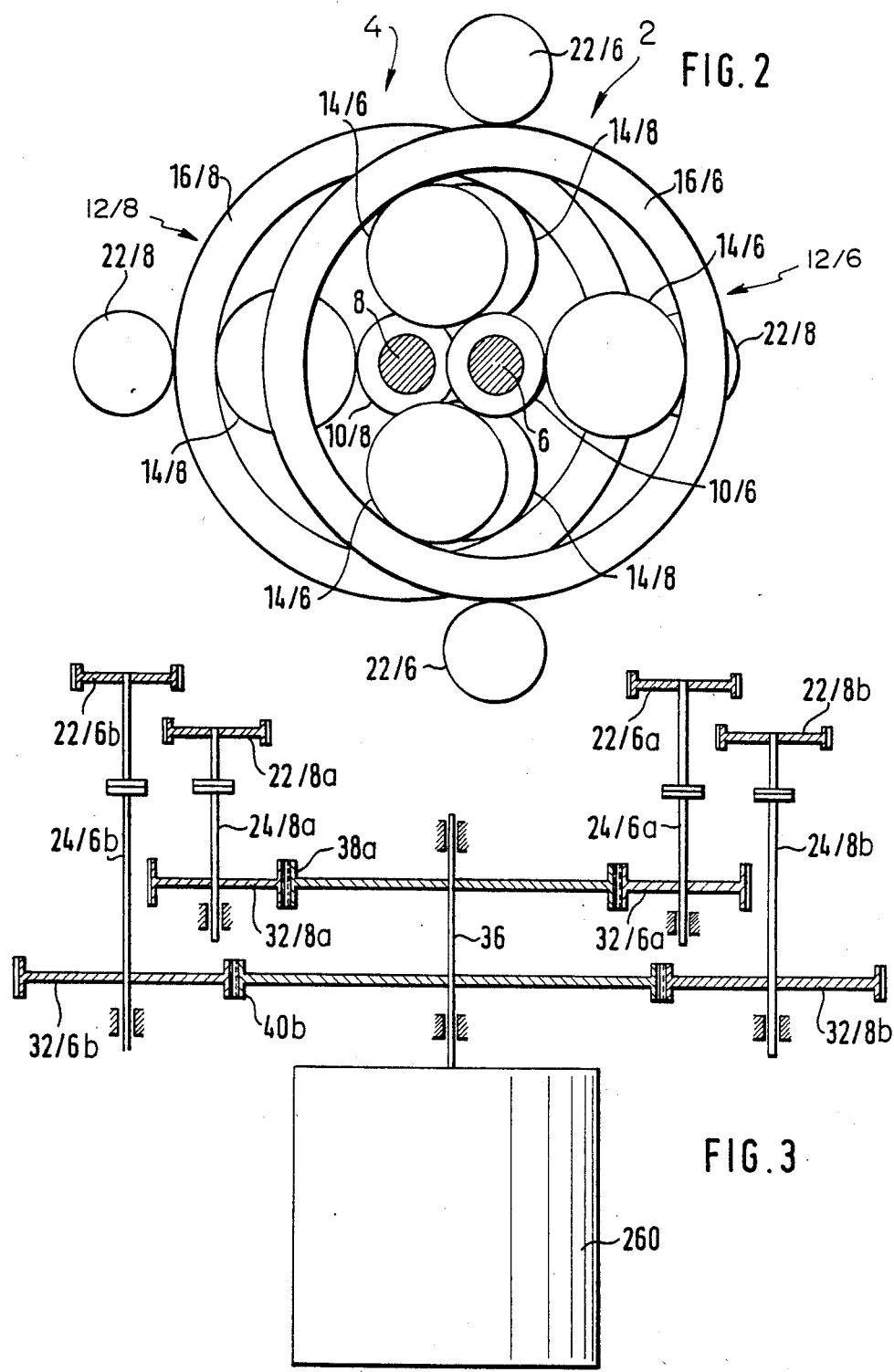

DRIVE SYSTEM FOR TWIN SCREW EXTRUDER

TECHNICAL FIELD

The present invention relates generally to power transmission gearing systems and more particularly to a drive system suitable for driving screws of a twin screw extruder.

BACKGROUND ART

Screw extruders have been employed for various purposes including applications in plastics technologies. Such devices utilized auger screws for transporting as well as extruding the working material. Twin screw extruders included a pair of screws extending along parallel axes relatively close to one another. To assure uniform extrusion flow, the screws were required to be driven both at the same speed. In some instances extruder screws were driven in the same direction of rotation, while in other instances each extruder screw was driven in an opposite direction. This, of course, depended upon the screw configuration. Relatively high torques were required to drive the screws. Such applications presented unique requirements for screw drive mechanisms.

One approach at providing a drive mechanism for a twin screw extruder was illustrated in United Kingdom Pat. No. 1,421,704. The extruder drive disclosed in such patent included a pair of output shafts, each of which was coupled to an extruder screw.

Each output shaft was driven by a planetary gear train having a separate motor. Speed synchronization was achieved by a gearing arrangement between the output shafts of each motor.

Each planetary gear train included a ring gear which was mounted for rotation within a drive casing by a ball bearing. Each gear set further included an idler sun gear and two planet gears, one of which was fixed to an input shaft and the other to an output shaft. The planet gears of each gear set were offset from each other about 90 degrees along the ring gear. One planet gear was driven through the input shaft by the motor. The other planet gear was fixed to the output shaft and was driven by the relative rotation between the sun gear and the ring gear. The two gear sets were coaxial but axially spaced from one another with the input shaft of one gear set being longer than the input shaft of the other.

Among the problems encountered with such prior drive system was that it was relatively bulky, heavy, and suffered from uneven distribution of loads over the ring gears. Excessive transverse forces acted upon the ring gears which mandated relatively heavy bearings for mounting the ring gears within the casing.

Additionally, because the power transmission from the input shaft to the output shaft extended through only two planet gears, relatively wide gearings were required to increase power transmission, increasing the weight, size and cost of the drive system.

A further problem encountered with the prior drive system was that since speed synchronization between the two gear sets was accomplished through a mechanical gear engagement, drive power from the motors were diverted to speed compensation functions rather than utilized solely for driving the extruder screws.

DISCLOSURE OF THE INVENTION

In compendium, the present invention comprises a drive system for a twin screw extruder. The system includes a pair of symmetrically arranged planetary gear sets. Each gear set includes a pair of input pinions and each pinion is independently driven by a motor. All motors are electronically speed synchronized. The input pinions engage diametrically opposed portions of a ring gear. The gear sets further include a plurality of planet idler gears which are only rotatable about their axes and a driven sun gear which drives an output shaft. Each planetary gear set is axially displaced from the other planetary gear set, and the output shafts of each extend through a space between the planet gears of the other gear set.

Power transmission is distributed over a plurality of planet gears so that the planet gears are capable of transmitting significant power without requiring extended teeth widths.

In addition, by disposing the driving pinions symmetrically over the circumference of the ring gear, transverse driving engagement forces acting upon the ring gears cancel each other out. As a result, the ring gear need not be journalled within bearings or relatively small bearings need only be employed to prevent shifts in ring gear position. Preferably, the ring gear is not secured by bearings and complete load equilization is achieved through free adjustment of the ring gears relative to the planet gears and the drive pinions.

In addition, drive system efficiency is improved through the implementation of electronic speed synchronization of the driving motors.

From the foregoing compendium, it will be appreciated that it is an aspect of the present invention to provide a drive system of the general character described which is not subject to the disadvantages of the background art as aforementioned.

A further aspect of the present invention is to provide a drive system of the general character described which is capable of significant power transmission yet is relatively small in size.

A further feature of the present invention is to provide a drive system of the general character described which provides uniform load distribution over a ring gear in a planetary gear set.

A further aspect of the present invention is to provide a drive system of the general character described wherein a planetary gear set is employed for power transmission without requiring bearing support.

An additional feature of the present invention is to provide a drive system of the general character described which is suitable for economical mass production fabrication at relatively low cost.

Another aspect of the present invention is to provide a drive system of the general character described with increased efficiency.

Other aspects and features of the present invention in part will be obvious and in part will be pointed out hereinafter.

With these ends in view, the invention finds embodiment in certain combinations of elements and arrangements of parts by which the said features and objects and certain other features, objects and aspects are hereinafter attained, all with reference to the accompanying drawings and the scope of which is more particularly pointed out and indicated in the appended claims.

BRIEF DESCRIPTION OF THE DRAWINGS

In the accompanying drawings in which are shown some of the various possible embodiments of the invention:

FIG. 2 is an elevational sectional view of the drive system taken substantially along the plane 2—2 of FIG. 1 wherein several components of the drive system are schematically shown in their actual location and wherein several components of the drive system, including a drive system casing, and gear teeth have been omitted for clarity; and FIG. 3 is a schematized distorted plan view of a portion of an alternate embodiment of the invention, wherein a single drive motor is provided and with the view distorted in a manner similar to that of FIG. 1.

BEST MODE FOR CARRYING OUT THE INVENTION

Figure 1:
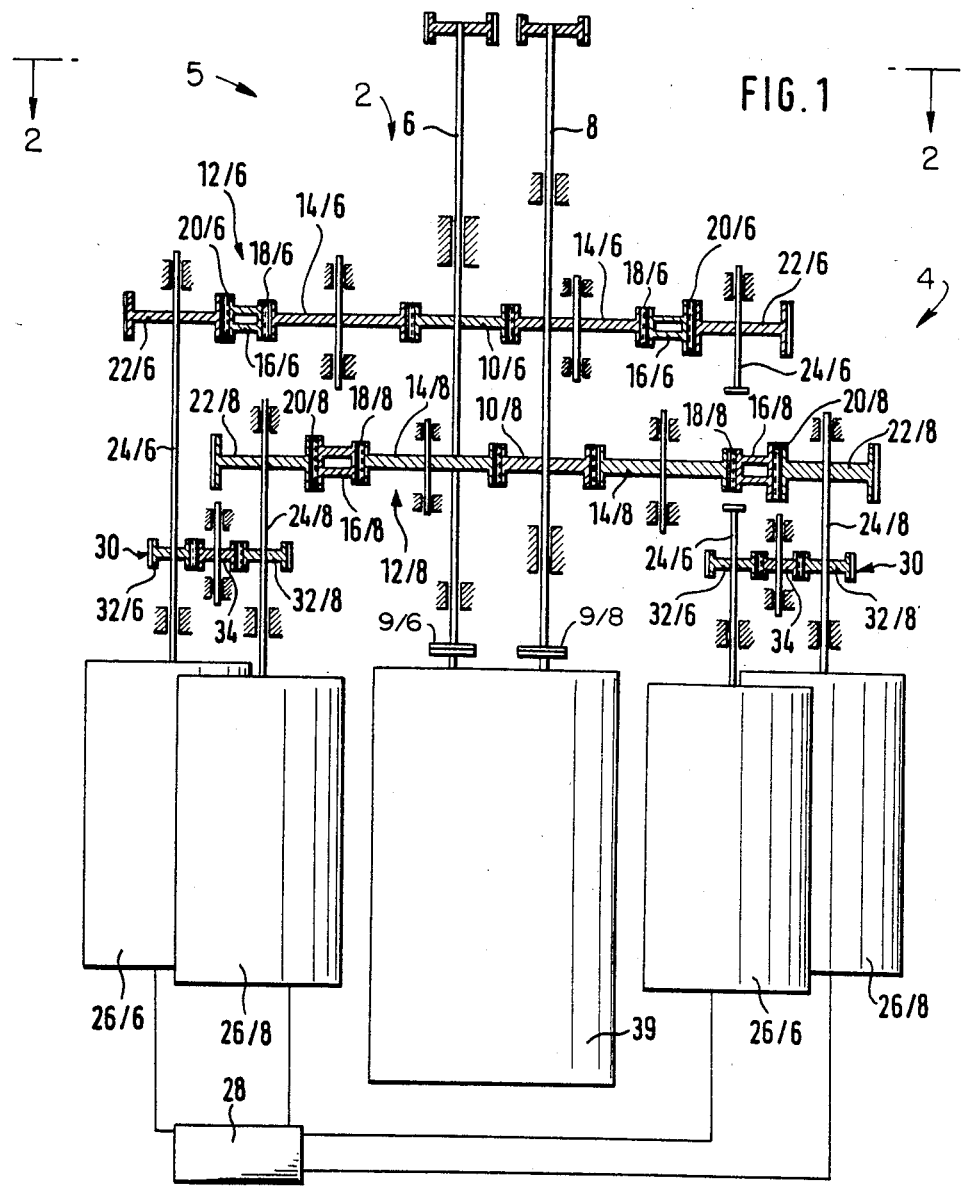
FIG. 1 is a schematized distorted plan view of a drive system for a twin screw extruder constructed in accordance with and embodying the invention and with components of the drive system positioned in a single plane for clarification of their operational interrelationship.

Referring now in detail to the drawings, the reference numeral 5 denotes generally a drive system constructed in accordance with and embodying the invention. The drive system 5 includes a pair of parallel axis juxtaposed output shafts 6, 8, each adapted to be coupled to one screw of a twin screw extruder. The coupling between the output shafts 6, 8 and their respective extruder screws may include a splined collar arrangement as illustrated in United Kingdom Pat. No. 1,421,704.

Pursuant to the invention, the output shafts 6, 8 are each driven by a separate gear train 2, 4, respectively. Corresponding components of each of the gear trains 2, 4 will be designated by the same reference numeral, however including a suffix number corresponding to its respective driven output shaft.

Each gear train 2, 4 includes a planetary gear set 12/6, 12/8 having a central sun gear 10/6, 10/8 to which is fixed the output shaft 6, 8. In addition, each planetary gear set includes three planet gears 14/6, 14/8 which are journalled to a drive system casing for rotation about fixed axes.

The planet gear 14/6, 14/8 simultaneously engage the sun gear 10/6, 10/8 and a ring gear 16/6, 16/8. The ring gear 16/6, 16/8 includes internal gear teeth 18/6, 18/8 and external teeth 20/6, 20/8. The internal teeth mesh with teeth of the planet gears 14/6, 14/8.

The planetary gear sets 12/6, 12/8 are driven by a pair of driven pinions 22/6, 22/8 which engage the external teeth 20/6, 20/8 of the ring gear. The drive pinions 22/6, 22/8 are equidistantly spaced about the periphery of the ring gear 16/6, 16/8. As illustrated in FIG. 2, if two drive pinions are employed, they are in diametrically opposed positions, for example. It should be understood that the symmetrical positioning of the drive pinions 22/6, 22/8 about the ring gear 16/6, 16/8 assures that transverse forces acting upon the ring gear will cancel each other out and the ring gear may be maintained without additional support and solely by tooth engagements between the drive pinions and the planet gears.

Each of the drive pinions 22/6, 22/8 is fixed to a drive shaft 24/6, 24/8 and is driven by an associated electric motor 26/6, 26/8. With two drive pinions for each gear train, two electric motors 26/6 and two electric motors 26/8 are employed. The motors are speed synchronized by an electronic synchronization circuit 28, known to those of skill in the art. Electronic synchronization of the drive motors 26/6, 26/8 provides greater operating efficiency and eliminates power loss due to synchronization functions.

In accordance with the invention, an auxiliary synchronization gear train 30 is provided between each drive shaft 24/6 of the gear train 2 and a corresponding drive shaft 24/8 of the gear train 4. The synchronization gearing 30 includes a pinion 32/6 fixed to each drive shaft 24/6 and a further pinion 32/8 fixed to each drive shaft 24/8. In addition, an idler pinion 34 drivingly interconnects the pinions 32/6 with the pinions 32/8 in configurations wherein all motor drive shafts turn in the same direction. In instances wherein the motor drive shafts turn in opposite directions, the intermediate gear 34 is omitted and the gears 32/6 and 32/8 are of larger diameter and directly intermesh. In such latter configuration, the screws of the twin screw extruder will turn in opposite directions.

The synchronization gearing 30 is provided as an auxiliary or backup synchronization device in the event the electronic synchronization circuit 28 becomes inoperative.

During extruder operation axial forces are transmitted from the extruder screws through the output shafts 6, 8. Suitable thrust bearings 9/6, 9/8 are provided adjacent the ends of the output shafts 6, 8. In addition the drive system 5 includes a suitable thrust bearing support 39 of conventional configuration for supporting the thrust bearings 9/6, 9/8. It should be additionally noted that while the drive system 5 has been illustrated as including three planet gears 14/6, 14/8, such arrangement is merely exemplary of an optimal embodiment with respect to transmission size, capacity and ratio. A greater number of planet gears may be employed providing they are evenly distributed. It should be understood, however, from an observation of FIGS. 1 and 2 that the output shafts 6, 8 extend through both planetary gear sets 12/6 and 12/8 and within the space between the planet gears. Any array of planet gears employed should include a sufficient space between the planet gears for the output shaft of the adjacent gear train.

In addition, it should be noted that while only two drive pinions 22/6, 22/8 have been illustrated in the drawings, additional drive pinions may be employed provided they are evenly distributed over the circumference over the ring gear 16/6, 16/8. Uniform distribution of drive pinions around the ring gear is a significant aspect of the invention because it assures the cancellation of transverse forces acting upon the ring gear.

With reference again to FIG. 1, it will be seen that various shafts have been shown journalled in fixed psoitions within the drive system casing. It should be noted that bearings are illustrated maintaining the drive shafts 6 and 8 in position both radially and axially. Further, all of the planet gears 14/6, 14/8 are shown as being journalled about fixed axes. Similarly, the motor drive shafts 24/6, 24/8 are shown journalled about fixed axes, as are the intermediate gears 34 of the synchronization gearing 30.

A further embodiment of the invention is illustrated in FIG. 3 wherein like numerals have been employed to designate components corresponding to those of the previous embodiment. In this embodiment, a single motor 260 is employed, and the drawing illustrates a power train branch from the motor 260 to a pair of drive pinions 22/6a, b for driving a ring gear 16/6 of a gear train 2 and a pair of drive pinions 22/8a, b for driving a ring gear 16/8 of a gear train 4.

The planetary gear sets and drive shafts associated with the gear trains 2, 4 of this embodiment are otherwise identical to those of the previous embodiment and have been omitted from the drawing.

It should be noted that the single motor 260 is provided for both gear trains 2, 4 in the modified embodiment. The motor 260 includes an output shaft 36 which carries a pair of pinions 38a, 40b. The pinion 38a is of smaller diameter than the pinion 40b and engages a spur gear 32/8a and a further spur gear 32/6a. The spur gears 32/8a and 32/6a are in engagement with the pinion 38a at diametrically opposed positions. A drive shaft 24/8a carries a drive pinion 22/8a and is fixed to the spur gear 32/8a. Similarly, a drive shaft 24/6a carries a drive pinion 22/6a and is fixed to the spur gear 32/6a. It should be appreciated that the drive shaft 24/6a is longer than the drive shaft 24/8a to assure proper engagement with the respective ring gears 16/6 and 16/8 which are axially spaced from one another.

Similarly, the gear 40b engages a spur gear 32/6b and a further spur gear 32/8b with the spur gears being diametrically opposed from one another. A further drive shaft 24/6b carries a drive pinion 22/6b and is fixed to the spur gear 32/6b while a further drive shaft 24/8b carries a drive pinion 22/8b and is fixed to the spur gear 32/8b. As with the drive shafts 24/8a and 24/6a, the drive shafts 24/6b and 24/8b are of different lengths. This assures proper engagement between the drive pinion 22/6b and the ring gear 16/6, as well as the drive pinion 22/8b and the ring gear 16/8.

Since the gear 40b drives on drive pinion of each of the gear trains and the gear 38a drives one of the drive pinions of each of the gear trains, automatic mechanical speed synchronization of both gear trains is achieved.

Although the drive system of the modified embodiment requires less space than drive systems of the background art, it does require more space than the drive system of the first embodiment. In order to provide a suitable bearing support for the required thrust bearings in the embodiment of FIG. 3, the motor 260 and a bearing support are required to be axially offset relative to each other and additional space is required for such purpose. In the prior embodiment, however, the bearing support 39 is disposed between the individual motors which results in axial space conservation.

Thus, it will be seen that there is provided a drive system for a twin screw extruder which achieves the various features and aspects of the present invention and which is well suited to meet the conditions of practical usage.

As various modifications might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A drive system suitable for a twin screw extruder having a pair of adjacent parallel axis extruder screws, the drive system including two adjacent parallel axis output shafts, each engageable with one of the extruder screws and separate gear train means for driving each output shaft, the gear train means having parallel axes which are adjacent one another, one gear train means being spaced axially behind the other gear train means, each gear train means including a planetary gear set, each planetary gear set comprising a ring gear, a plurality of drive pinions, means journalling the drive pinions for rotation about fixed axes, the drive pinions being in driving engagement with the ring gear, the drive pinions being equidistantly spaced from one another along the periphery of the ring gear, each planetary gear set further including a plurality of planet gears and a sun gear, the planet gears being equidistantly spaced from one another along the periphery of the ring gear, means journalling each planet gear for rotation about a fixed axis, the sun gear axes of the two planetary gear sets being adjacent and parallel to one another and means interconnecting the sun gear of each gear set with one of the output shafts whereby relatively high driving torques are provided.

2. A drive system suitable for driving a twin screw extruder as constructed in accordance with claim 1 wherein each ring gear includes internal teeth and external teeth, the drive pinions being in intermeshing tooth engagement with the external teeth and the planet gears being in intermeshing tooth engagement with the internal teeth.

3. A drive system suitable for driving a twin screw extruder as constructed in accordance with claim 1 further including bearing-free means for supporting the ring gear for rotation about the axis of the sun gear, the bearing-free supporting means comprising the engagement between the ring gear and the planet gears.

4. A drive system suitable for driving a twin screw extruder as constructed in accordance with claim 3 wherein the supporting means further comprises the engagement between the ring gear and the drive pinions.

5. A drive system suitable for a twin screw extruder as constructed in accordance with claim 1 further including separate electric motor means in driving engagement with each drive pinion.

6. A drive system suitable for a twin screw extruder as constructed in accordance with claim 5 further including means for synchronizing the speeds of the electric motors, the synchronizing means comprising an electronic synchronization circuit.

7. A drive system suitable for a twin screw extruder constructed in accordance with claim 1 further including gear means for synchronizing the drive pinions of both planetary gear sets.

8. A drive system suitable for a twin screw extruder constructed in accordance with claim 7 wherein the synchronizing gear means comprises interengaged gears interconnecting a drive pinion of one planetary gear set with a drive pinion of the other planetary gear set.

9. A drive system suitable for a twin screw extruder constructed in accordance with claim 6 further including auxiliary gear means for synchronizing the drive pinions of both planetary gear sets.

10. A drive system suitable for a twin screw extruder constructed in accordance with claim 1 further including an electric motor and gear means drivingly interconnecting the electric motor with each of the drive pinions.

11. A drive system suitable for driving a twin screw extruder constructed in accordance with claim 1 including two drive pinions associated with each planetary gear set, the drive pinions being spaced from one another at diametrically opposed positions relative to the ring gear.

12. A drive system suitable for a twin screw extruder constructed in accordance with claim 1 wherein the means journalling the sun gear for rotation about a fixed axis includes a sun gear shaft, the sun gear being fixed to the sun gear shaft, the sun gear shaft of each planetary gear set extending through a space between the planet gears of the other planetary gear set.

13. A drive system suitable for a twin screw extruder constructed in accordance with claim 12 wherein each sun gear shaft comprises the output shaft.

14. A drive system constructed in accordance with claim 13 wherein the extruder screws exert axial thrust on the sun gear shafts, the drive system further including thrust bearing means associated with each sun gear shaft and thrust bearing support means, the thrust bearing means being interconnected with the trhrust bearing support means, the thrust bearing means being positioned intermediate the drive pinion.

15. A drive system constructed in accordance with claim 14 further including separate motor means in driving engagement with each drive pinion, the thrust bearing support means positioned between the separate motor means whereby a space conserving configuration is obtained.

16. A transmission drive system suitable for a twin screw extruder having a pair of adjacent parallel axes, the transmission drive system including two adjacent parallel axes putput shafts, each engageable with one of the extruder screws and a pair of planetary gear trains, each gear train including a ring gear, a plurality of planet gears engaging the ring gear, means rotatively mounting each planet gear about a fixed axis, each planetary gear train further including a sun gear, each planet gear engaging a sun gear, each output shaft extending through the ring gears, each sun gear being mounted for rotation coaxially and non-rotatively with an output shaft, at least two drive pinions engaging the periphery of each ring gear, the drive pinions being equidistantly spaced from one another, separate motor means engaging each drive pinion and means for synchronizing the output speeds of the motor means.

17. A transmission drive system constructed in accordance with claim 16 wherein the motor means comprise an electric motor, the means for synchronizing comprising electrical means.

18. A transmission drive system constructed in accordance with claim 16 wherein the means for synchronizing comprises gear means.

19. A transmission drive system constructed in accordance with claim 18 wherein the gear means interconnects the drive pinion of one gear train with drive pinion of the other gear train.

20. A transmission drive system constructed in accordance with claim 16 further comprising bearing free means for rotationally carrying each ring gear, the means for rotationally carrying each ring gear comprising the engagement between each ring gear and its drive pinions and planet gears.

* * * * *